United States Patent
Zhu (10) Patent No.: US 11,853,896 B2
(45) Date of Patent: Dec. 26, 2023

(54) NEURAL NETWORK MODEL, METHOD, ELECTRONIC DEVICE, AND READABLE MEDIUM

(71) Applicant: LYNXI TECHNOLOGIES CO., LTD., Beijing (CN)

(72) Inventor: Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/910,443

(22) PCT Filed: Dec. 28, 2021

(86) PCT No.: PCT/CN2021/141963
§ 371 (c)(1),
(2) Date: Sep. 9, 2022

(87) PCT Pub. No.: WO2022/143625
PCT Pub. Date: Jul. 7, 2022

(65) Prior Publication Data
US 2023/0162041 A1    May 25, 2023

(30) Foreign Application Priority Data
Dec. 30, 2020   (CN) .......................... 202011610261.7

(51) Int. Cl.
*G06N 3/084*    (2023.01)
*G06N 3/04*    (2023.01)

(52) U.S. Cl.
CPC ............... *G06N 3/084* (2013.01); *G06N 3/04* (2013.01)

(58) Field of Classification Search
CPC .................................. G06N 3/084; G06N 3/04
See application file for complete search history.

(56) References Cited

U.S. PATENT DOCUMENTS

2018/0121805 A1    5/2018   Stone
2020/0356850 A1   11/2020   Fukuda et al.

FOREIGN PATENT DOCUMENTS

CN      105095961 A     11/2015
CN      105095966 A     11/2015
(Continued)

OTHER PUBLICATIONS

Duport et al., "Analog Input Layer for Optical Reservoir Computers," in arXiv preprint arXiv: 1406.3238 (2014). (Year: 2014).*
(Continued)

*Primary Examiner* — Ryan C Vaughn
(74) *Attorney, Agent, or Firm* — Li & Cai Intellectual Property (USA) Office (57) ABSTRACT

The present disclosure belongs to the technical field of machine learning. Specifically provided is a neural network model, including at least one intermediate layer including different types of neurons which correspond to different types of neural networks. The neural network model is obtained based on an initial neural network and a multi-valued mask during a training process, and the multi-valued mask is obtained by means of performing multi-value processing on a continuous mask. Further provided are a method for training neural network model, a time sequence data processing method, an electronic device, and a readable medium.

11 Claims, 5 Drawing Sheets

(56) References Cited

FOREIGN PATENT DOCUMENTS

| | | |
|---|---|---|
| CN | 108830827 A | 11/2018 |
| CN | 109344959 A | 2/2019 |
| CN | 109858620 A | 6/2019 |
| CN | 110020715 A | 7/2019 |
| CN | 111462173 A | 7/2020 |
| CN | 112686381 A | 4/2021 |

OTHER PUBLICATIONS

WIPO, International Search Report dated Mar. 15, 2022.
China Patent Office, First Office Action dated Jul. 14, 2023 for application No. CN202011610261.7.

* cited by examiner

NEURAL NETWORK MODEL, METHOD, ELECTRONIC DEVICE, AND READABLE MEDIUM

CROSS-REFERENCE TO RELATED APPLICATIONS

The present application is a National Phase Application filed under 35 U.S.C. 371 as a national stage of PCT/CN2021/141963, filed on Dec. 28, 2021, an application claiming priority from Chinese Patent Application No. 202011610261.7, filed on Dec. 30, 2020 in the Chinese Intellectual Property Office, contents of which are hereby incorporated herein by reference in their entirety.

TECHNICAL FIELD

The present disclosure relates to the technical field of machine learning, and in particular, to a neural network model, a method, an electronic device and a readable medium.

BACKGROUND

Neural networks are one kind of machine learning models, and are often used for modeling complex tasks in the fields of speech recognition, image classification, face recognition, and natural language processing due to their excellent expression capabilities.

A structure of a neural network model includes an input layer, intermediate layers (hidden layers) including a plurality of neurons, and an output layer, and complexity and expression capability of the neural network model can be adjusted by adjusting the number of the neurons. Different neural network models are usually used independently. For example, an artificial neural network and a spiking neural network are often used independently, and cannot be used together.

SUMMARY

A neural network model, a method, an electronic device, and a readable medium are provided.

In a first aspect, a neural network model is provided, and includes at least one intermediate layer including different types of neurons which correspond to different types of neural networks, wherein the neural network model is obtained based on an initial neural network and a multi-valued mask during a training process, and the multi-valued mask is obtained by performing multi-value processing on a continuous mask.

In a second aspect, a method for training a neural network model is provided, and includes: respectively updating a current initial neural network and a current initial continuous mask based on first gradient information of the initial neural network and second gradient information of the initial continuous mask to obtain an intermediate continuous mask, wherein the initial neural network includes neuron groups which are the same as the initial continuous mask in structure but different from the initial continuous mask in type, and the first gradient information and the second gradient information are obtained based on a network loss of processing a training sample by the initial neural network; performing multi-value processing on the intermediate continuous mask to obtain a multi-valued mask, wherein different mask values of the multi-valued mask correspond to different types of neuron groups; updating the current initial neural network based on first gradient information of the current initial neural network, updating the intermediate continuous mask based on second gradient information of the multi-valued mask, and performing the multi-value processing on the updated intermediate continuous mask to obtain the updated multi-valued mask; and if a termination condition is currently met, obtaining a neural network model based on the current initial neural network and the updated multi-valued mask.

In a third aspect, a method for processing time sequence data is provided, and includes: inputting the time sequence data to a neural network model to obtain a processing result representing characteristics of the time sequence data, wherein the neural network model is the neural network model provided herein, and is obtained through training with the method for training a neural network model provided herein.

In a fourth aspect, an electronic device is provided, and includes: at least one processor; and a memory which is communicatively connected to the at least one processor, wherein the memory stores instructions executable by the at least one processor, and when the instructions are executed by the at least one processor, the at least one processor performs any one of the method for training a neural network model and the method for processing time sequence data.

In a fifth aspect, a non-transitory computer-readable storage medium storing computer instructions is provided, and when the computer instructions are executed by a computer, the computer performs any one of the method for training a neural network model and the method for processing time sequence data.

It should be understood that the contents described in the SUMMARY are not intended to identify key features or critical features of the present disclosure, and are not used to limit the scope of the present disclosure. Other features of the present disclosure will become apparent from the following description.

BRIEF DESCRIPTION OF DRAWINGS

The drawings are used to enable better understanding of the technical solutions herein and do not constitute any limitation to the present disclosure. In the drawings.

DETAIL DESCRIPTION OF EMBODIMENTS

The exemplary embodiments of the present disclosure are illustrated below with reference to the drawings, various details of the embodiments of the present disclosure are included to facilitate understanding, but the details should be considered as merely for illustration. Therefore, it should be understood by those of ordinary skill in the art that various changes and modifications can be made to the embodiments described herein without departing from the scope and the spirit of the present disclosure. For the purposes of clarity and conciseness, description of well-known functions and structures is omitted in the following description.

All embodiments of the present disclosure and the features thereof may be combined with one another if no conflict is incurred.

The term "and/or" used herein indicates inclusion of any and all combinations of one or more of related listed items.

The terms used herein are only used to describe specific embodiments, and are not intended to limit the present disclosure. As used herein, "one" and "the" which indicate a singular form may also indicate a plural form, unless otherwise stated in the text. It should be further understood that the term "comprise" and/or the term "be made of . . . " used herein indicate presence of features, integers, steps, operations, elements and/or components, but do not exclude presence or addition of one or more other features, integers, steps, operations, elements, components and/or groups thereof.

Neural networks are one kind of machine learning models, and are mathematical models of algorithms which simulate behavioral characteristics of an animal neural network and perform distributed parallel information processing. Depending on system complexity, the neural networks achieve information processing by adjusting mutual connection relationships of a large number of internal nodes.

Neural network models include a feedforward neural network model and a feedback neural network model when classified according to topological structures, and include a continuous network model and a discrete network model when classified according to performance. Different neural network models have different processing capabilities and different advantages. For example, both an artificial neural network model and a spiking neural network model can be configured to process information streams having time-space domains, and a convolutional neural network can be configured to process discrete information streams.

Figure 1:
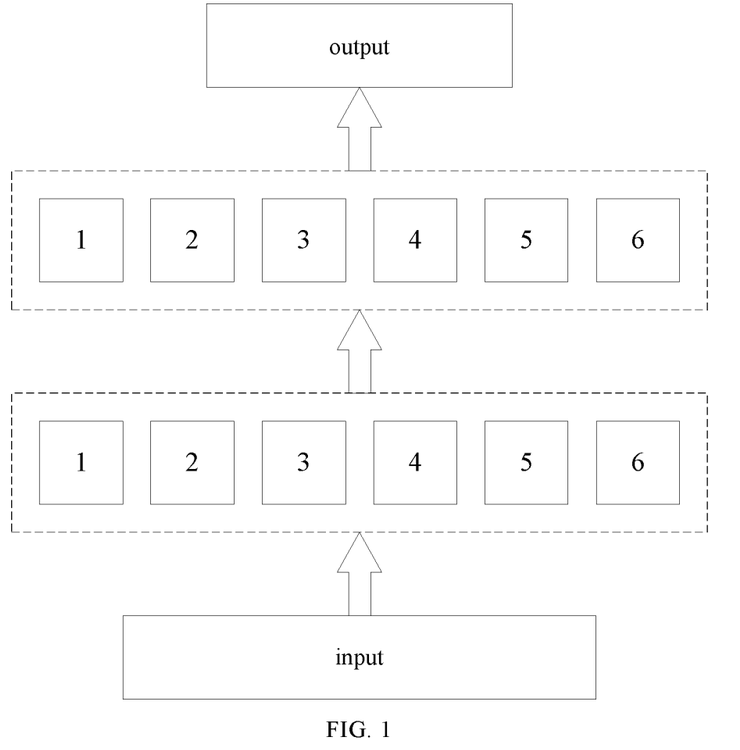
FIG. 1 is a schematic diagram of information processing using an artificial neural network model alone.
Figure 2:
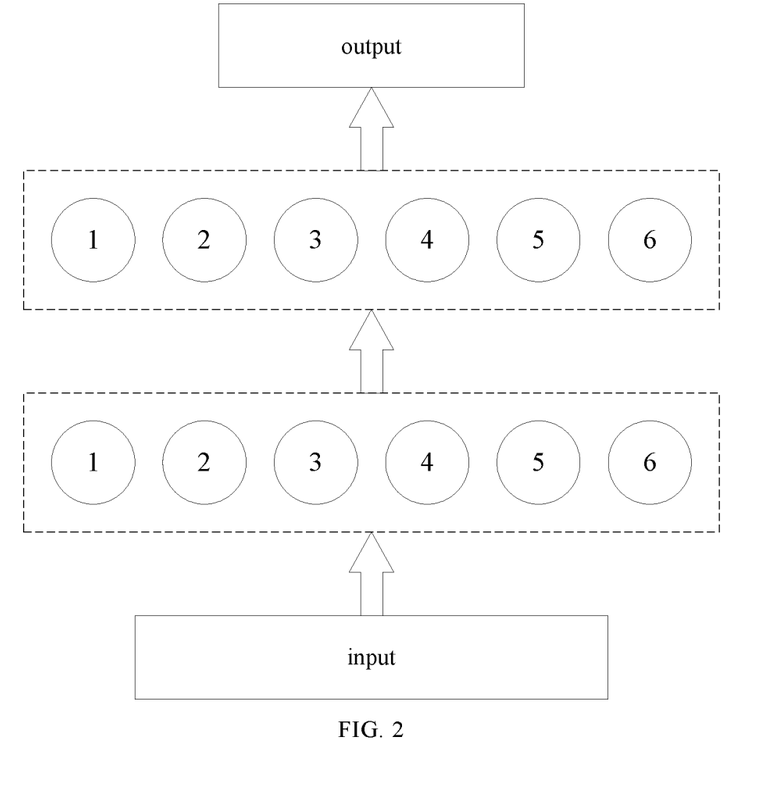
FIG. 2 is a schematic diagram of information processing using a spiking neural network model alone.

Different neural network models have their own advantages and disadvantages, but the existing neural network models can only be used independently and cannot be used together, so that the disadvantages of the different neural network models cannot be balanced, which affects the application of the neural networks. For example, both the artificial neural network model and the spiking neural network model can be used for speech recognition processing or natural language processing, as shown in FIG. 1 and FIG. 2. In FIG. 1, the square boxes represent an artificial neural network, and the numbers in the square boxes represent neurons of the artificial neural network. Input neurons of the artificial neural network are of only one type, i.e., only the neurons of the artificial neural network, and output neurons are also the neurons of the artificial neural network. In FIG. 2, the circles represent a spiking neural network, and numbers in the circles represent neurons of the spiking neural network. Input neurons of the spiking neural network are of only one type, i.e., only the neurons of the spiking neural network, and output neurons are also the neurons of the spiking neural network.

In practical applications, the artificial neural network model has high accuracy but involves a large calculation amount, while the spiking neural network model involves small calculation amount but has low accuracy. Since the artificial neural network model and the spiking neural network model can only be used independently, the high accuracy of the artificial neural network model and the small calculation amount of the spiking neural network model cannot be balanced, and therefore, the small calculation amount and the high accuracy cannot be achieved simultaneously.

In a first aspect, the present disclosure provides a neural network model capable of splicing neural networks corresponding to different types of neurons, so that advantages of neural network models corresponding to the different types of neurons can be combined, and disadvantages of the neural network models corresponding to the different types of neurons can be balanced.

The neural network model provided by the present disclosure includes: at least one intermediate layer including different types of neurons which correspond to different types of neural networks; and the neural network model is obtained based on an initial neural network and a multi-valued mask during a training process, and the multi-valued mask is obtained by performing multi-value processing on a continuous mask.

The neural networks are the networks which simulate behavioral characteristics of an animal neural network. The types of the neural networks may be determined according to their processing capabilities. For example, a feedback artificial neural network and a spiking neural network may be classified into the same neural network type according to their capabilities of processing a time sequence. That is, the feedback artificial neural network and the spiking neural network are the neural networks having the capabilities of processing the time sequence; and a time sequence is a data sequence in which data are arranged in time order, vary with time and are interrelated.

The multi-valued mask may be configured to classify and extract the different types of neurons during a training phase of the neural network model.

In the present disclosure, each intermediate layer of the neural network model is provided with the different types of neurons. Even if the neural networks corresponding to the different types of neurons are of the same neural network type, the types of the neurons are different.

The intermediate layer of the neural network model includes: neurons of a feedback artificial neural network and neurons of a spiking neural network. The feedback artificial neural network and the spiking neural network both belong to a neural network type having the capability of processing a time sequence, but the neurons corresponding to the feedback artificial neural network and those corresponding to the spiking neural network belong to two different neuron types.

The neural networks corresponding to the different types of neurons include, but are not limited to, the feedback artificial neural network and the spiking neural network.

Illustratively, the neural networks corresponding to the different types of neurons may include the spiking neural network and at least one kind of artificial neural network; or the neural networks corresponding to the different types of neurons may include at least two kinds of artificial neural networks.

The artificial neural networks may include, but are not limited to: at least one of a convolutional neural network, a regional convolutional neural network, a deconvolutional network, a fully convolutional network, and a recurrent neural network such as a gated recurrent neural network, a long short-term memory neural network, a bidirectional recurrent neural network and a stacking-based deep neural network.

For facilitating understanding and simplifying description, by taking a case where the neural network model includes two intermediate layers and each intermediate layer includes two types of neurons as an example, a plurality of embodiments are described below to illustrate a structural principle of the neural network model. However, the description below should not be interpreted as limiting a scope or practicability of the technical solutions of the present disclosure. A structural principle of the neural network model, in which the number of the intermediate layers is greater than 2 and/or the number of the types of the neurons included in each intermediate layer is greater than 2, is consistent with the structural principle of the neural network model, in which the number of the intermediate layers is 2 and the number of the types of the neurons included in each intermediate layer is 2.

Figure 3:
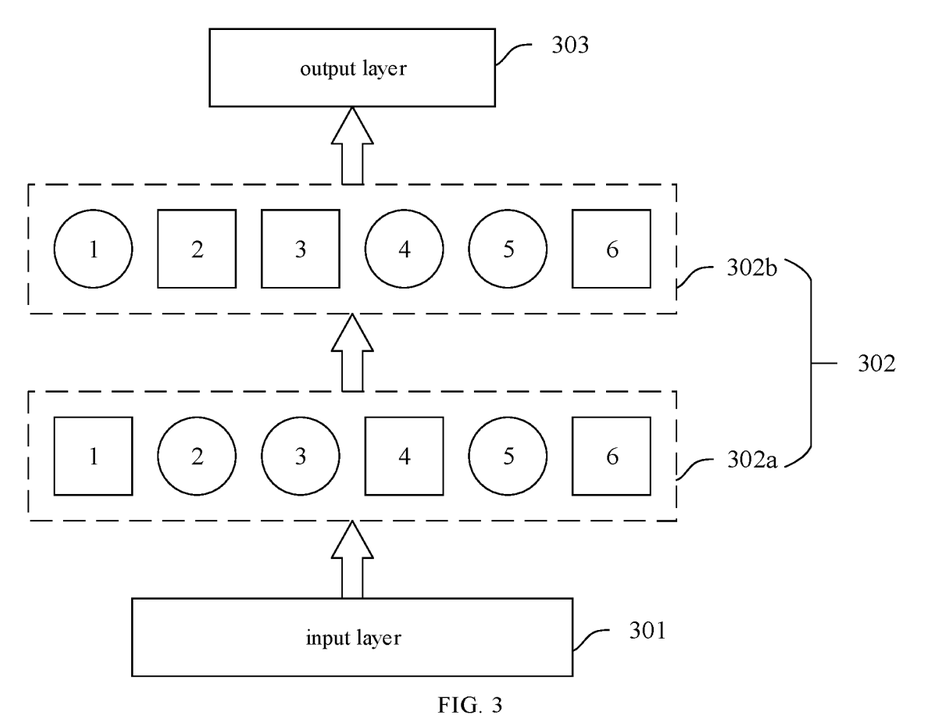
FIG. 3 is a block diagram illustrating a principle of a neural network model according to the present disclosure.

FIG. 3 is a block diagram illustrating a principle of a neural network model according to the present disclosure. With reference to FIG. 3, the neural network model includes an input layer 301 configured to acquire a processing element, intermediate layers 302 configured to process the processing element, and an output layer 303 configured to output a processing result. At least one of the input layer 301, the intermediate layers 302 and the output layer 303 includes the different types of neurons.

The processing element includes, but is not limited to, a speech processing element, a natural language processing element, and an image processing element. For example, the input layer 301 extracts one or more pieces of corpus information from a speech according to corpus points of the processing element in a speech recognition process.

The intermediate layers include a first intermediate layer 302a and a second intermediate layer 302b, and each of the first intermediate layer 302a and the second intermediate layer 302b includes two types of neurons. In the first intermediate layer 302a, elements 1, 4, and 6 represent neurons of the artificial neural network, and elements 2, 3, and 5 represent neurons of the spiking neural network. In the second intermediate layer 302b, elements 2, 3, and 6 represent the neurons of the artificial neural network, and element 1, 4, and 5 represent the neurons of the spiking neural network.

After the first intermediate layer 302a receives an input from the input layer 301, the first intermediate layer 302a processes the neurons thereof and outputs a processing result to the second intermediate layer 302b; after receiving the result output by the first intermediate layer 302a, the second intermediate layer 302b processes the neurons thereof, and outputs a result to the output layer 303; and the output layer 303 outputs a processing result.

With the neural network model provided by the embodiments of the present disclosure, which includes the at least one intermediate layer including different types of neurons, the different types of neurons are used to obtain advantages of the corresponding neural networks, and meanwhile disadvantages of other neural networks are overcome, so that the advantages of the neural networks corresponding to the different types of neurons are effectively combined, and meanwhile the disadvantages of the other neural networks are avoided, thereby expanding an application range and improving flexibility of the neural networks.

Moreover, when the neural network model includes the neurons of the feedback artificial neural network and the neurons of the spiking neural network, the neural network model can effectively combine advantages of the feedback artificial neural network and those of the spiking neural network, that is, improving recognition accuracy and increasing calculation efficiency, thereby expanding the application range and improving the flexibility of the neural networks.

In a second aspect, the present disclosure provides a method for training a neural network model. With the method, a neural network model provided with at least one layer including a plurality of types of neurons can be built, so as to expand an application range of the neural network model and improve flexibility of the neural network model.

Figure 4:
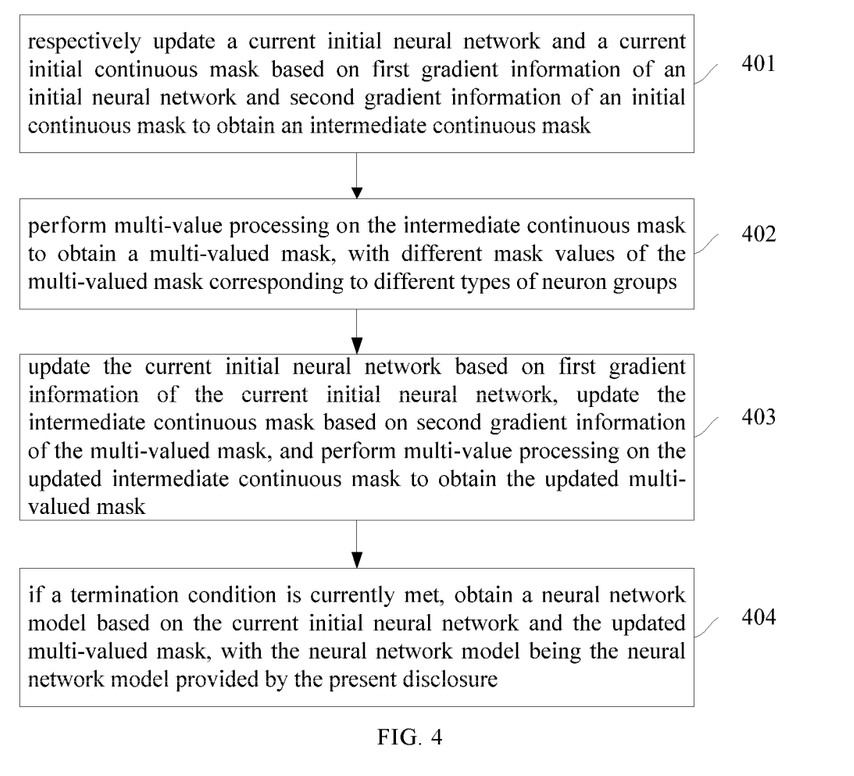
FIG. 4 is a flowchart illustrating a method for training a neural network model according to the present disclosure.

FIG. 4 is a flowchart illustrating a method for training a neural network model according to the present disclosure. With reference to FIG. 4, the method for training a neural network model provided by the present disclosure includes the following steps 401 to 404.

In step 401, a current initial neural network and a current initial continuous mask are respectively updated based on first gradient information of the initial neural network and second gradient information of the initial continuous mask to obtain an intermediate continuous mask. The initial neural network includes neuron groups which are the same as the initial continuous mask in structure but different from the initial continuous mask in type, and the first gradient information and the second gradient information are obtained based on a network loss of processing a training sample by the initial neural network.

In step 401, the first gradient information of the initial neural network refers to a change value (variation amount) of at least one layer of the neural networks, and a gradient of a following layer is obtained by combination of previous layers. The second gradient information of the initial continuous mask is a change value (variation amount) of the continuous mask, and may be arbitrarily set as needed.

In the present disclosure, the gradient information is vector information, and may be referred to as a gradient vector which may indicate a direction along which model parameters are updated during a training process of the neural network model. When the model parameters are updated according to a magnitude of the gradient vector along the direction indicated by the gradient vector, it may be ensured that a result obtained by each time of training of the neural network model is closer to a target of model training.

In step 401, the number of types of the neuron groups is greater than or equal to 2. For example, in a case where the number of the types of the neuron groups is equal to 2, the neuron groups which are the same as the initial continuous mask in structure but different from the initial continuous mask in type include a first neuron group and a second neuron group. In other words, in this example, a structure of the initial neural network is the same as that of the initial continuous mask, and includes two different types of neuron groups, where the neuron groups are sets of neurons.

The current initial neural network and the current initial continuous mask are respectively updated based on the first gradient information of the initial neural network and the second gradient information of the initial continuous mask, so as to obtain the intermediate continuous mask.

Each of the initial continuous mask and the intermediate continuous mask includes a plurality of elements, and a mask value of each element is any value in [0, 1], such as 0.01, 0.02 . . . 0.98 or 0.99.

The initial neural network and the initial continuous mask are trained using a pre-acquired training sample, where the training sample refers to data configured to train a neural network. The training sample may be a training sample having time sequence data. For example, the training sample is at least one of an image sample, a speech sample and a text sample, which are obtained by conversion of data having time sequence characteristics. The data having the time sequence characteristics are referred to as time sequence data for short, and include a set of data ordered in time, and the set of data may reflect a state or a degree of a change of things, phenomena, etc. over time. For example, the time sequence data may include speech data, natural language data, and video data.

In the present disclosure, corresponding training samples may be selected according to different application scenarios of the neural network model. For example, if the neural network model is applied to image recognition, the data of the training sample include a plurality of frames of image data; and if the neural network model is applied to speech recognition, the data of the training sample include a plurality of frames of speech data.

Before step 401, the method may further include: setting the initial neural network and the initial continuous mask. The initial neural network may be a neural network formed by splicing at least two different types of neurons as described in the above embodiments. For example, the initial neural network may be a neural network formed by splicing the neurons of the artificial neural network and the neurons of the spiking neural network. A mask value of at least one element of the initial continuous mask may be any value in [0, 1], and at least one element is consecutively arranged in order.

The training sample may be input to the initial neural network to be processed to obtain a processing result of the training sample; a network loss of the initial neural network is determined according to the processing result of the training sample and labeling information; and the first gradient information of the initial neural network and the second gradient information of the initial continuous mask are determined according to the network loss. Further, the current initial neural network and the current initial continuous mask are respectively updated to obtain the intermediate continuous mask in step 401.

In step 402, multi-value processing is performed on the intermediate continuous mask to obtain the multi-valued mask, and different mask values of the multi-valued mask correspond to different types of neuron groups.

The multi-valued mask may be any multi-valued mask such as a binary mask, a ternary mask, or a quaternary mask. Illustratively, all mask values of the multi-valued mask belong to a predetermined value set, which may at least include 0 and 1. For example, the mask values of the binary mask belong to a value set of $\{0, 1\}$; the mask values of the ternary mask belong to a value set of $\{0, 0.5, 1\}$; the mask values of the quaternary mask belongs to a value set of $\{0, 0.4, 0.8, 1\}$; and in any multi-valued mask, the mask values except 0 and 1 may be customized according to actual needs, and are not specifically limited herein.

In step 403, the current initial neural network is updated based on first gradient information of the current initial neural network, the intermediate continuous mask is updated based on second gradient information of the multi-valued mask, and the multi-value processing is performed on the updated intermediate continuous mask to obtain the updated multi-valued mask.

The multi-valued mask may include a plurality of elements, each of the plurality of elements corresponds to a continuous mask. That is, each continuous mask corresponds to one multi-valued mask.

In the present disclosure, since the multi-valued mask cannot be updated directly, the multi-valued mask needs to be updated through the continuous mask; specifically, the multi-value processing may be performed on the intermediate continuous mask obtained in step 401 to obtain the multi-valued mask, the intermediate continuous mask is updated according to the second gradient information of the multi-valued mask, and then the multi-value processing is performed on the updated intermediate continuous mask to obtain the updated multi-valued mask, thus updating the multi-valued mask.

Taking the binary mask as an example, the binary mask includes a plurality of elements, each of the plurality of elements corresponds to the continuous mask. That is, each continuous mask corresponds to one binary mask. A mask value of each element of the binary mask is 0 or 1.

Since the binary mask cannot be updated directly, the binary mask needs to be updated through the continuous mask. Therefore, binary-value processing is performed on the intermediate continuous mask obtained in step 401 to obtain the binary mask, the intermediate continuous mask is updated according to the second gradient information of the binary mask, and the binary-value processing is performed on the updated intermediate continuous mask to obtain the updated binary mask, thus updating the binary mask.

During the updating process of the binary mask, the current initial neural network is updated based on the first gradient information of the initial neural network, and meanwhile the intermediate continuous mask is updated based on the second gradient information of the binary mask.

When performing the binary-value processing on the continuous mask, a first intermediate value may be set as greater than 0 and less than 1, a mask value of an element of the continuous mask is compared with the first intermediate value, and then a binarized mask value is determined according to a result of the comparison. If the mask value of the element of the continuous mask is greater than or equal to the first intermediate value, the binarized mask value is 1; and if the mask value of the element of the continuous mask is less than the first intermediate value, the binarized mask value is 0.

For example, the binary-value processing is performed on the continuous mask by rounding, and the first intermediate value is set to be 0.5. When the mask value of the element of the continuous mask is 0.4, the binarized mask value is 0; and when the mask value of the element of the continuous mask is 0.8, the binarized mask value is 1.

Taking the ternary mask as an example, the ternary mask includes a plurality of elements, each of the plurality of elements corresponds to the continuous mask. That is, each continuous mask corresponds to one ternary mask. A mask value of each element in the ternary mask may be, for example, 0, 0.5, or 1.

During the updating process of the ternary mask, the current initial neural network is updated based on the first gradient information of the initial neural network, and meanwhile the intermediate continuous mask is updated based on the second gradient information of the ternary mask.

When performing ternary-value processing on the continuous mask, two intermediate values, i.e., a second intermediate value and a third intermediate value, may be set; the second intermediate value is greater than 0 and less than 0.5, and the third intermediate value is greater than 0.5 and less than 1. After a mask value of an element of the continuous mask is compared with the second intermediate value and the third intermediate value, a tri-valued mask value is determined according to a result of the comparison. If the mask value of the element of the continuous mask is greater than or equal to the second intermediate value and less than the third intermediate value, the tri-valued mask value is 0.5; if the mask value of the element of the continuous mask is less than the second intermediate value, the tri-valued mask value is 0; and if the mask value of the element of the continuous mask is greater than or equal to the third intermediate value, the tri-valued mask value is 1.

The multi-valued mask may be the binary mask, the ternary mask . . . an N-valued mask, with N being an integer greater than or equal to 2; when N is greater than 3, the updating process of the N-valued mask and a processing flow of N-value processing performed on the continuous mask are consistent with the updating processes and the processing flows described above by taking the binary mask and the ternary mask as examples, and are not described in detail herein.

It should be noted that the embodiments are not limited to adopting rounding for performing multi-value processing on the continuous mask, and may also adopt other methods to perform multi-value processing, such as a multi-value sampling method, a histogram method, or a mean value calculation method. A way of multi-value processing is not limited herein, and may be, for example, a binary sampling method, the histogram method, or the mean value calculation method.

In step 404, if a termination condition is currently met, a neural network model is obtained based on the current initial neural network and the updated multi-valued mask. The neural network model is the neural network model provided by the present disclosure.

The termination condition of the neural network model includes, but is not limited to, a convergence condition, a predetermined number of cycles, and a loss value. When the training of the neural networks meets the termination condition, the neural network model is obtained based on the current initial neural network and the multi-valued mask.

For example, when the convergence condition is met in the training process of the neural network model, the training process of the neural networks is stopped, and the neural network model is obtained based on the current initial neural network and the multi-valued mask.

In another example, the number of cycles is predetermined. When the times of training reach the predetermined number of cycles, the training process of the neural networks is stopped, and the neural network model is obtained based on the current initial neural network and the multi-valued mask.

In yet another example, a loss value of a function is preset. When a function value reaches the loss value in the training process of the neural networks, the training process of the neural networks is stopped, and the neural network model is obtained based on the current initial neural network and the multi-valued mask.

When a mask model is built using the fixed multi-valued mask obtained in step 404, parameters of the multi-valued mask and the network are not changed any more.

In the method for training a neural network model provided by the present disclosure, the current initial neural network and the current initial continuous mask are respectively updated based on the first gradient information of the initial neural network and the second gradient information of the initial continuous mask to obtain the intermediate continuous mask, the multi-value processing is performed on the intermediate continuous mask to obtain the multi-valued mask, the current initial neural network is updated based on the first gradient information of the current initial neural network, the intermediate continuous mask is updated based on the second gradient information of the multi-valued mask, the multi-value processing is performed on the updated intermediate continuous mask to obtain the updated multi-valued mask, and the neural network model is obtained based on the current initial neural network and the updated multi-valued mask when the termination condition is currently met. The neural network splices the different types of neurons together, so that advantages of neural networks corresponding to the different types of neurons can be effectively combined, the recognition accuracy can be improved and calculation efficiency can be increased, thereby expanding the application range and improving the flexibility of the neural networks.

In some embodiments, step 401 includes: updating parameters of the current initial neural network and mask values of elements of the current initial continuous mask by a gradient descent algorithm based on the first gradient information of the initial neural network and the second gradient information of the initial continuous mask.

The gradient descent algorithm is a method of finding a minimum value of a target function or converging to a minimum value, and can obtain an optimal mask. The gradient descent algorithm may include a back propagation algorithm based on the gradient descent algorithm, an Adam optimization algorithm, etc.

Illustratively, when the multi-valued mask is the binary mask, the different types of neuron groups include a first neuron group and a second neuron group, the initial neural network includes two types of neurons, i.e., a first neuron and a second neuron, an output from the first neuron in the initial neural network enters a next layer after being filtered by a mask value X of a corresponding element, and an output from the second neuron in the initial neural network enters the next layer after being filtered by (1−X).

For example, the neurons of the initial neural network include a neuron of the artificial neural network and a neuron of the spiking neural network, the first neuron is the neuron of the artificial neural network, and the second neuron is the neuron of the spiking neural network; alternatively, the first neuron is the neuron of the spiking neural network, and the second neuron is the neuron of the artificial neural network.

In a process of filtering the neurons of the neural networks by a neuron mask, the different types of neurons are spliced together. An output from each layer of the neural network is spliced according to X×RNN+(1−X)×SNN. Where X denotes a mask value of an element, RNN denotes the neuron of the artificial neural network, and SNN denotes the neuron of the spiking neural network.

Parameters of the neural networks are parameters representing network characteristics, such as the number of network nodes, an initial training value, a minimum training rate, the number of iterations, sigmoid parameters, etc.

In some embodiments, step 401 includes: in a case where mask values of the initial continuous mask meet a first constraint condition, updating the parameters of the current initial neural network and the mask values of the elements of the current initial continuous mask by the gradient descent algorithm based on the first gradient information of the initial neural network and the second gradient information of the initial continuous mask.

The first constraint condition includes a plurality of constraint conditions which limit an average of elements of each layer of the initial continuous mask; and/or a constraint condition which limits an average of all elements of the initial continuous mask.

Illustratively, if the first constraint condition is set to be that an average of elements in a first layer of the initial continuous mask is 0.4, in a process of training the neural network by the gradient descent algorithm, the first layer of the neural network should meet the condition that the average of the elements included in the first layer is 0.4 when the parameters of the current initial neural network and the mask values of the elements of the current initial continuous mask are updated.

In another example, if the first constraint condition is set to be that the average of all the elements of the initial continuous mask is 0.6, in the process of training the neural network by the gradient descent algorithm, the average of all the elements of the neural network should be 0.6 when the parameters of the current initial neural network and the mask values of the elements of the current initial continuous mask are updated.

In some embodiments, step 403 includes: updating the parameters of the current initial neural network and the mask values of elements of a current multi-valued mask by the gradient descent algorithm based on the first gradient information of the current initial neural network.

The gradient descent algorithm is a method of finding the minimum value of the target function or converging to the minimum value, and can obtain the optimal mask.

In some embodiments, for an element with a mask value of 1 in the current multi-valued mask, a first neuron at a corresponding position in the current initial neural network is determined as a neuron at a corresponding position in the neural network model; and for an element with a mask value of 0 in the current multi-valued mask, a second neuron at a corresponding position in the current initial neural network is determined as a neuron at a corresponding position in the neural network model.

Figure 5:
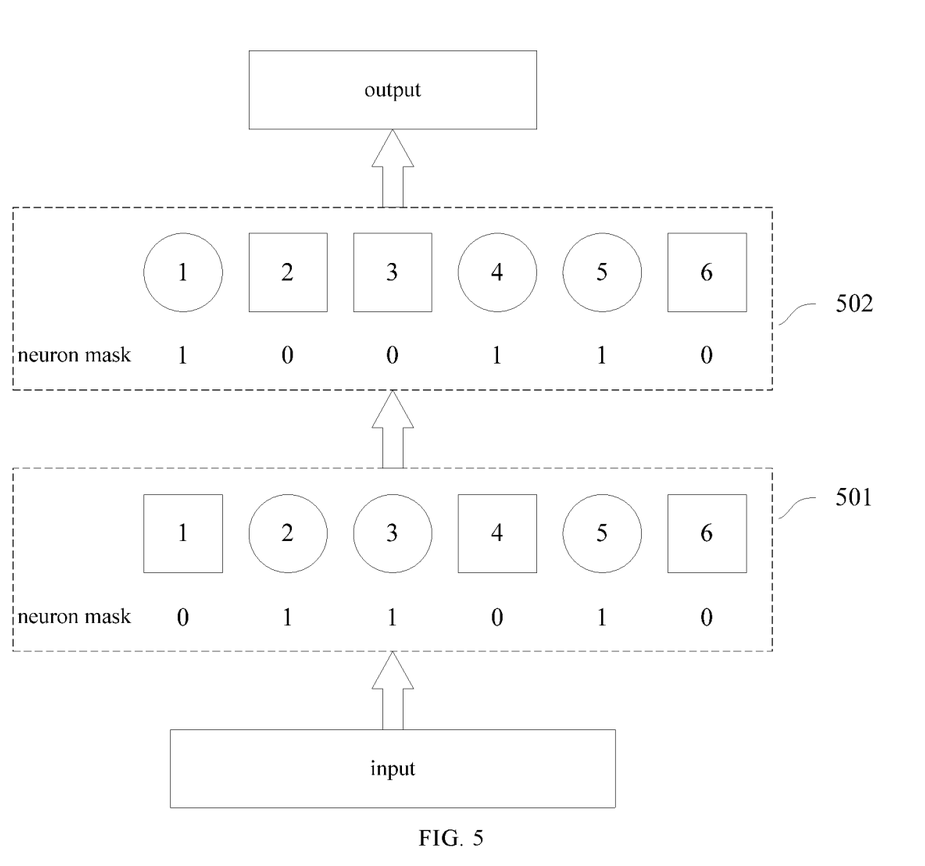
FIG. 5 is a schematic diagram of splicing two types of neurons using a neural network model provided by the present disclosure.

With reference to FIG. 5, in a first layer 501 of the neural network, elements 1, 4, and 6 corresponding to element positions with mask values of 0 are determined as the first neurons, and elements 2, 3, and 5 corresponding to element positions with mask values of 1 are determined as the second neurons. In a second layer 502 of the neural network, elements 2, 3, and 6 corresponding to element positions with mask values of 0 are determined as the first neurons, and elements 1, 4, and 5 corresponding to element positions with mask values of 1 are determined as the second neurons.

In some embodiments, step 403 includes: in a case where the mask values of the multi-valued mask meet a second constraint condition, updating the parameters of the current initial neural network and the mask values of the elements of the current multi-valued mask by the gradient descent algorithm based on the first gradient information of the current initial neural network; and a mask value of any element of the multi-valued mask is equal to a first value or a second value.

The second constraint condition includes a plurality of constraint conditions which limit a proportion of elements, whose mask values are equal to the first value, in each layer of the multi-valued mask; and/or, a constraint condition which limits a proportion of elements, whose mask values are equal to the first value, among all the elements of the multi-valued mask.

In some embodiments, the second constraint condition is that a proportion of elements, whose mask values are equal to a specified mask value, in each layer of the multi-valued mask is a preset proportion threshold; for example, the proportion limited by the second constraint condition is a proportion of elements, whose mask values are equal to "1", in each layer of the binary mask, or a proportion of elements, whose mask values are equal to "0", in each layer of the binary mask. For example, the second constraint condition is to limit a proportion of elements, whose mask values are equal to "1", in a first layer to 80% and limit a proportion of elements, whose mask values are equal to "0", in the first layer to 20%. Alternatively, the second constraint condition is to limit the proportion of the elements, whose mask values are equal to "1", in the first layer to 50% and limit the proportion of the elements, whose mask values are equal to "0", in the first layer to 50%. Alternatively, the second constraint condition is to limit the proportion of the elements, whose mask values are equal to "1", in the first layer to 20% and limit the proportion of the elements, whose mask values are equal to "0", in the first layer to 80%. The constraint proportions listed here are for illustration, and specific values of the constraint proportions are not limited herein.

According to the present disclosure, by modifying the constraint condition of the mask, the flexibility of the neural network model can be improved so as to adapt to different application scenarios and requirements.

During the training process of the neural networks, the neuron mask is applied to the neural networks for training. The different types of neurons are classified using the neuron mask to obtain corresponding types of neuron groups.

The neuron mask provided by the embodiments can mix and splice the different types of neurons to obtain a set of neurons, thereby obtaining a neural network hybrid model.

In the above embodiments of the present disclosure, the different types of neurons include at least two types of neurons. For simplifying the description, the method for training a neural network model is illustrated by the plurality of embodiments described above by taking two types of neurons and the corresponding binary mask as an example. However, the description should not be interpreted as limiting the scope or the practicability of the technical solutions of the present disclosure, and other training methods for the neural network model, which involve more types of neurons and a multi-valued mask, are consistent with the method for training a neural network model, which involves the two types of neurons and the binary mask.

The neuron mask provided by the present disclosure can splice the different types of neurons together to obtain a set of neurons, the neural networks obtained through the neuron mask can splice the different types of neurons together to obtain a splicing result, the neural network model can effectively combine the advantages of the neural networks corresponding to the different types of neurons, improve recognition accuracy, and increase calculation efficiency, thereby expanding the application range and improving the flexibility of the neural networks.

When the neural network model provided by the present disclosure is a hybrid model obtained based on the artificial neural network and the spiking neural network, the neural network model can obtain higher accuracy, and can reduce the calculation amount, increase the calculation efficiency, and balance the accuracy and the calculation efficiency. In addition, by adjusting the neuron mask, the flexibility of the neural network model can be improved.

In a third aspect, the present disclosure provides a method for processing time sequence data, which adopts the neural network model provided by the present disclosure to process the time sequence data.

The method for processing time sequence data includes: inputting the time sequence data to the neural network model to obtain a processing result representing characteristics of the time sequence data, and the neural network model is the neural network model provided by the present disclosure, and is obtained through training with the method for training a neural network model provided by the present disclosure.

The time sequence data are a set of data ordered in time, such as speech data, natural language data, and video data. The processing result has the characteristic of the time sequence data. In a case of the voice data and the natural language data, the processing result may be a corresponding character or a meaning represented by the character. In a case of the video data, the processing result may be a picture or a meaning represented by the picture.

The neural network model provided by the present disclosure is used to process information for speech recognition, natural language processing, etc.

The method for processing time sequence data provided by the present disclosure can splice neurons of different types of neural networks, so as to effectively combine the advantages of the different types of neural networks, improve recognition accuracy, and increase calculation efficiency, thereby expanding the application range and improving the flexibility of the neural networks.

In a fourth aspect and a fifth aspect, the present disclosure further provides an electronic device and a readable storage medium.

Figure 6:
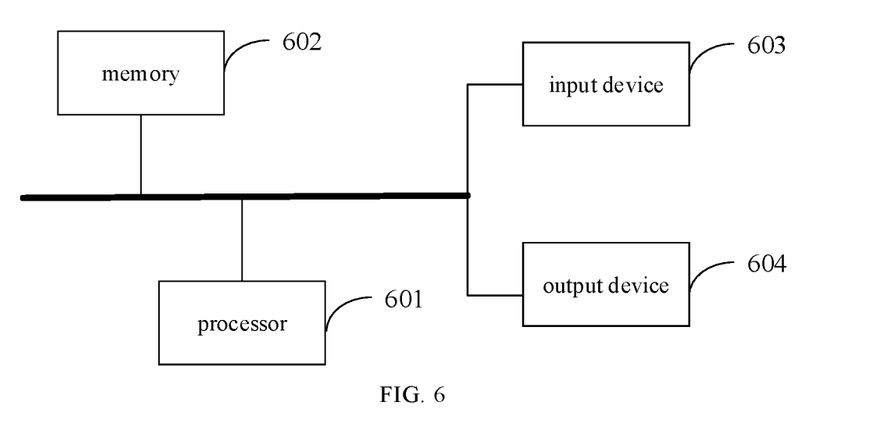
FIG. 6 is a block diagram of an electronic device used to implement the present disclosure.

FIG. 6 is a block diagram of an electronic device for implementing the method for training a neural network model or the method for processing time sequence data according to the present disclosure. The electronic device is intended to represent various digital computers, such as a laptop, a desktop, a workstation, a personal digital assistant, a server, a blade server and a mainframe computer, and other proper computers. The electronic device may also represent various mobile devices, such as a personal digital processor, a cellular telephone, a smart phone, a wearable device, and other similar computing devices. The components illustrated herein, connection and relationships among the components, and functions of the components are only for illustration, and are not intended to limit implementations of the present disclosure described and/or required herein.

As shown in FIG. 6, the electronic device includes: one or more processors 601, a memory 602, and interfaces for connection of all components, which include high-speed interfaces and low-speed interfaces. All the components are connected to one another through different buses, and may be mounted on a common motherboard or mounted in other manners as desired. The processors may be configured to process instructions executed within the electronic device, and the instructions include the instructions which are stored in or on the memory to display graphical information of an Graphical User Interface (GUI) on an external input/output device (such as a display device coupled to an interface). In other implementations, if needed, a plurality of processors and/or a plurality of buses may be used together with a plurality of memories. Similarly, a plurality of electronic devices may be connected, with each device providing some necessary operations (for example, serving as an array of servers, a group of blade servers, or a multi-processor system). One processor 601 is shown in FIG. 6 as an example.

The memory 602 is a non-transitory computer-readable storage medium provided herein. The memory has stored instructions executable by at least one processor, so as to enable the at least one processor to perform the method for training a neural network model or the method for processing time sequence data provided herein. The non-transitory computer-readable storage medium of the present disclosure has stored computer instructions configured to enable a computer to perform the method for training a neural network model or the method for processing time sequence data provided herein.

As the non-transitory computer-readable storage medium, the memory 602 may be configured to store non-transitory software programs, non-transitory computer executable programs, and modules, such as program instructions/modules corresponding to the method for training a neural network model or the method for processing time sequence data provided by the embodiments of the present disclosure. The processor 601 executes various functional applications of a server and performs data processing by running the non-volatile software programs, the instructions and the modules stored in the memory 602, that is, implementing the method for training a neural network model or the method for processing time sequence data provided by the above method embodiments of the present disclosure.

The memory 602 may include a program storage region and a data storage region, and the program storage region may store an operating system, and an application program required by at least one function; and the data storage region may store data created according to use of the electronic device for implementing the method for training a neural network model or implementing information processing. Further, the memory 602 may include a high-speed random access memory, and may also include a non-volatile memory, such as at least one magnetic disk, a flash memory, or other non-volatile solid-state memories. In some embodiments, the memory 602 may optionally include a memory remotely arranged relative to the processor 601, and the remote memory may be connected to the electronic device for implementing the method for training a neural network model or implementing information processing via a network. Examples of the network include, but are not limited to, the Internet, an intranet, a local area network (LAN), a mobile communication network, and combinations thereof.

The electronic device for implementing the method for training a neural network model or the method for processing time sequence data may further include: an input device 603 and an output device 604. The processor 601, the memory 602, the input device 603, and the output device 604 may be connected through a bus or by other means, and connecting through a bus shown in FIG. 6 as an example.

The input device 603 may receive input numbers or input character information, and generate a key signal input related to user settings and function control of the electronic device for implementing the method for training a neural network model or implementing information processing. For example, the input device 603 may be a touch screen, a keypad, a mouse, a trackpad, a touch pad, an indicator rod, one or more mouse buttons, a trackball, a joystick, or other input devices. The output device 604 may include a display device, an auxiliary lighting device (e.g. a light emitting diode (LED)), a tactile feedback device (e.g. a vibrating motor), etc. The display device may include, but is not limited to, a liquid crystal display (LCD), an LED display, and a plasma display. In some implementations, the display device may be a touch screen.

Various implementations of the systems and the techniques described herein may be realized in a digital electronic circuit system, an integrated circuit system, an application specific integrated circuit (ASIC), computer hardware, firmware, software, and/or combinations thereof. Those implementations may include: implementing in one or more computer programs, the one or more computer programs is executable and/or interpretable on a programmable system including at least one programmable processor, and the programmable processor may be a dedicated programmable processor or a general purpose programmable processor, and may receive data and instructions from a storage system, at least one input device and at least one output device, and transmit the data and the instructions to the storage system, the at least one input device, and the at least one output device.

Those computer programs (also called programs, software, software applications, or codes) include machine instructions of the programmable processor, and may be implemented using an advanced process and/or an object-oriented programming language, and/or an assembly/machine language. The terms "machine-readable medium" and "computer-readable medium" used herein refer to any computer program product, apparatus, and/or device (e.g. a magnetic disk, an optical disc, a memory, and a programmable logic device (PLD)) configured to provide the machine instructions and/or the data for the programmable processor, and such computer program product, apparatus, and/or device include a machine-readable medium which receives the machine instructions as machine-readable signals. The term "machine-readable signal" refers to any signal configured to provide the machine instructions and/or the data for the programmable processor.

The embodiments of the present disclosure further provide a computer program product, including computer-readable code, or a non-transitory computer-readable storage medium carrying the computer-readable code. When the computer-readable code is run in the processor of the electronic device, the processor of the electronic device performs the method for training a neural network model or the method for processing time sequence data described in the above embodiments.

For providing interaction with a user, the systems and the techniques described herein may be implemented on a computer, which is provided with: a display device (e.g. a cathode ray tube (CRT) or an LCD monitor) configured to display information for the user; and a keyboard and a pointing device (e.g. a mouse or a trackball), and the user can provide an input for the computer with the keyboard and the pointing device. Other kinds of devices may also be used to provide interaction with the user; for example, feedback provided for the user may be sensory feedback in any form (e.g. visual feedback, auditory feedback, or tactile feedback); and an input from the user may be received in any form (including an acoustic input, a speech input, or a tactile input).

The systems and the techniques described herein may be implemented in a computing system (e.g. a data server) including a back-end component, or a computing system (e.g. an application server) including a middleware component, or a computing system (e.g. a user computer having a GUI or a web browser, and the user can interact with the implementations of the systems and the techniques described herein through the GUI or the web browser) including a front-end component, or a computer system including any combination of the back-end component, the middleware component and the front-end component. The components of the system may be interconnected through any form or medium of digital data communication (e.g. a communication network). Examples of the communication network include: an LAN, a wide area network (WAN), and the Internet.

The computer system may include a client and a server. The client and the server are generally remote from each other and usually interact with each other through the communication network. A relationship between the client and the server is established by running computer programs having a client-server relationship on corresponding computers.

It should be understood that various above-described forms of flows may be used to reorder, add or delete the steps. For example, all the steps recorded herein may be performed in parallel, or performed sequentially, or performed in different orders as long as the desired results of the technical solutions disclosed herein can be produced. The order in which the steps are performed is not limited herein.

The different embodiments of the present disclosure can be combined with each other without going against logic, and different embodiments are described with different emphases, and what is not emphasized may be found in the description of the other embodiments; in some embodiments of the present disclosure, the functions of the device provided by the embodiments of the present disclosure or the modules included by such device may be used to perform the methods described in the above method embodiments, and specific implementations and technical effects of the methods may be found in the description of the above method embodiments, and will not be repeated here for the purposes of clarity and conciseness.

The above specific implementations do not constitute any limitation to the scope of the present disclosure. It should be understood by those of ordinary skill in the art that various modifications, combinations, sub-combinations and substitutions can be made according to design requirements and other factors. Any modification, equivalent replacement, and improvement made within the spirit and the principle of the present disclosure shall be included in the scope of the present disclosure.

What is claimed is:

1. A method for training a neural network model, comprising:
respectively updating a current initial neural network and a current initial continuous mask based on first gradient information of the initial neural network and second gradient information of the initial continuous mask to obtain an intermediate continuous mask, wherein the initial neural network comprises neuron groups which are same as the initial continuous mask in structure but different from the initial continuous mask in type, and the first gradient information and the second gradient information are obtained based on a network loss of processing a training sample by the initial neural network;
performing multi-value processing on the intermediate continuous mask to obtain a multi-valued mask, wherein different mask values of the multi-valued mask correspond to different types of neuron groups;
updating the current initial neural network based on first gradient information of the current initial neural network, updating the intermediate continuous mask based on second gradient information of the multi-valued mask, and performing the multi-value processing on the updated intermediate continuous mask to obtain the updated multi-valued mask; and
if a termination condition is currently met, obtaining a neural network model based on the current initial neural network and the updated multi-valued mask, wherein the neural network model comprises at least one intermediate layer comprising different types of neurons which correspond to different types of neural networks.

2. The method of claim 1, wherein respectively updating the current initial neural network and the current initial continuous mask based on the first gradient information of the initial neural network and the second gradient information of the initial continuous mask comprises:

updating parameters of the current initial neural network and mask values of elements of the current initial continuous mask by a gradient descent algorithm based on the first gradient information of the initial neural network and the second gradient information of the initial continuous mask.

3. The method of claim 2, wherein updating the current initial neural network based on the first gradient information of the current initial neural network, updating the intermediate continuous mask based on the second gradient information of the multi-valued mask, and performing the multi-value processing on the updated intermediate continuous mask to obtain the updated multi-valued mask comprises:

updating the parameters of the current initial neural network based on the first gradient information of the current initial neural network and updating the intermediate continuous mask based on the second gradient information of the multi-valued mask, by the gradient descent algorithm; and performing the multi-value processing on mask values of elements of the updated intermediate continuous mask to obtain the updated multi-valued mask.

4. The method of claim 1, wherein the multi-valued mask comprises a binary mask, and the different types of neuron groups comprise a first neuron group and a second neuron group; a mask value of any element of the initial continuous mask and a mask value of any element of the continuous mask are in [0, 1]; and a mask value of any element of the multi-valued mask comprises 0 or 1; and an output from a first neuron in the initial neural network enters a next layer after being filtered by a mask value X of a corresponding element, and an output from a second neuron in the initial neural network enters the next layer after being filtered by (1−X); and the first neuron is one of a neuron of an artificial neural network and a neuron of a spiking neural network, and the second neuron is the other of the neuron of the artificial neural network and the neuron of the spiking neural network.

5. The method of claim 1, wherein updating the current initial continuous mask based on the first gradient information of the initial neural network comprises:

in a case where mask values of the initial continuous mask meet a first constraint condition, updating the initial continuous mask based on the first gradient information.

6. The method of claim 1, wherein updating the intermediate continuous mask based on the second gradient information of the multi-valued mask, and performing the multi-value processing on the updated intermediate continuous mask to obtain the updated multi-valued mask comprises:

in a case where mask values of the multi-valued mask meet a second constraint condition, updating the intermediate continuous mask based on the second gradient information of the multi-valued mask; and performing the multi-value processing on the updated intermediate continuous mask to obtain the updated multi-valued mask.

7. A method for processing time sequence data, comprising:

inputting the time sequence data to a neural network model to obtain a processing result representing characteristics of the time sequence data, wherein the neural network model comprises at least one intermediate layer comprising different types of neurons which correspond to different types of neural networks, and is obtained through training with the method for training the neural network model of claim 1.

8. An electronic device, comprising:
at least one processor; and
a memory which is communicatively connected to the at least one processor;
wherein the memory stores instructions executable by the at least one processor, and when the instructions are executed by the at least one processor, the at least one processor performs the method of claim 7.

9. A non-transitory computer-readable storage medium storing computer instructions, wherein when the computer instructions are executed by a computer, the computer performs the method of claim 7.

10. An electronic device, comprising:
at least one processor; and
a memory which is communicatively connected to the at least one processor;
wherein the memory stores instructions executable by the at least one processor, and when the instructions are executed by the at least one processor, the at least one processor performs the method of claim 1.

11. A non-transitory computer-readable storage medium storing computer instructions, wherein when the computer instructions are executed by a computer, the computer performs the method of claim 1.

* * * * *